(12) United States Patent
Araki (10) Patent No.: US 9,193,123 B2
(45) Date of Patent: *Nov. 24, 2015

(54) TIRE MANUFACTURING APPARATUS

(75) Inventor: Yusuke Araki, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/522,559

(22) PCT Filed: Dec. 3, 2010

(86) PCT No.: PCT/JP2010/071650
§ 371 (c)(1),
(2), (4) Date: Oct. 18, 2012

(87) PCT Pub. No.: WO2011/086784
PCT Pub. Date: Jul. 21, 2011

(65) Prior Publication Data
US 2013/0037216 A1 Feb. 14, 2013

(30) Foreign Application Priority Data
Jan. 18, 2010 (JP) .................. 2010-008508

(51) Int. Cl.
*B29D 30/58* (2006.01)
*B29D 30/26* (2006.01)
*B29D 30/52* (2006.01)

(52) U.S. Cl.
CPC ............ *B29D 30/2607* (2013.01); *B29D 30/52* (2013.01); *B29D 30/58* (2013.01); *B29D 2030/585* (2013.01)

(58) Field of Classification Search
CPC ................... B29D 30/0016; B29D 2030/0038; B29D 2030/088; B29D 3/1614; B29D 30/2607; B29D 30/3014; B29D 2030/4418; B29D 2030/523; B29D 30/56; B29D 30/26; B29D 30/52; B29D 2030/082; B29D 2030/086; B29D 2030/585; B29D 30/58; B29D 30/1614
USPC .......... 156/96, 126, 127, 128.1, 128.6, 130.3, 156/405.1, 406.2, 406.6, 412.8; 198/817; 414/910
See application file for complete search history.

(56) References Cited

U.S. PATENT DOCUMENTS 2,878,857 A * 3/1959 Smith et al. ................. 156/406.2
3,976,532 A 8/1976 Barefoot
(Continued)

FOREIGN PATENT DOCUMENTS

EP 1 547 758 A2 6/2005
JP 61-263517 * 11/1986 ............. B65G 47/52
(Continued)

OTHER PUBLICATIONS

English language Abstract for SU 1812129 (original document dated Apr. 1993).*
(Continued)

*Primary Examiner* — Martin Rogers
(74) *Attorney, Agent, or Firm* — Sughrue Mion, PLLC (57) ABSTRACT

A tire manufacturing apparatus for precisely mounting an annular tread on a base tire with the width center of the base tire aligned with the width center of the annular tread. The tire manufacturing apparatus includes a drum to which a base tire is secured, a holding means for holding the annular tread by its inner periphery, and a moving means for having the holding means approach or separate from the drum along the rotation axis of the drum. The holding means is provided with a conveying means to have the annular tread, which is held by the holding means, approach or separate from the base tire. And the conveying means mounts the annular tread on the outer periphery of the base tire by conveying the annular tread in the approaching direction at a conveyance speed which is equal to the travel speed of the holding means in the separating direction.

4 Claims, 6 Drawing Sheets

(56) References Cited

U.S. PATENT DOCUMENTS

| | | | |
|---|---|---|---|
| 4,951,892 A * | 8/1990 | Chaplin et al. | 242/533.8 |
| 4,957,574 A * | 9/1990 | Clayton et al. | 156/126 |
| 5,144,996 A * | 9/1992 | Kinuhata et al. | 157/13 |
| 5,206,720 A * | 4/1993 | Clothiaux et al. | 348/95 |
| 8,166,883 B1 * | 5/2012 | Coots | 104/16 |
| 2005/0087428 A1 * | 4/2005 | Pelak et al. | 198/780 |
| 2009/0260744 A1 * | 10/2009 | Bobinger et al. | 156/117 |

FOREIGN PATENT DOCUMENTS

| | | | | |
|---|---|---|---|---|
| JP | 3-227872 A | | 10/1991 | |
| JP | 6-27397 Y2 | | 7/1994 | |
| JP | 09-131805 | * | 5/1997 | B29D 30/08 |
| JP | 2001-198991 A | | 7/2001 | |
| JP | 2003-181949 A | | 7/2003 | |
| JP | 2007-161430 A | | 6/2007 | |
| RU | 1812129 | * | 4/1993 | B29D 30/26 |

OTHER PUBLICATIONS

English language Abstract for JP 61-263517 (original document dated Nov. 1986).*

BST Camera for Digital Detection of Web Edges and Web Center-Lines Taken from the BST International Website http://www.bst-international.com/uploads/media/CCDPro_en_01.pdf Documented by the Internet Archive Wayback Machine to be published at least by Nov. 20, 2008.*

English language translation of SU 1812129 (original document dated Apr. 1993).*

Machine generated English language translation of JP 09-131805.*

Written Opinion of the International Searching Authority, PCT/JP2010/071650, dated Mar. 8, 2011.

Extended European Search Report issued in European Application No. 10843139.6 dated May 23, 2013.

* cited by examiner

TIRE MANUFACTURING APPARATUS

CROSS REFERENCE TO RELATED APPLICATIONS

This application is a National Stage of International Application No. PCT/JP2010/071650 filed Dec. 3, 2010, claiming priority based on Japanese Patent Application No. 2010-008508 Jan. 18, 2010, the contents of all of which are incorporated herein by reference in their entirety.

TECHNICAL FIELD

The present invention relates to a tire manufacturing apparatus and, in particular, to a tire manufacturing apparatus for mounting a tread having been formed in an annular shape on a base tire.

BACKGROUND ART

An apparatus for mounting a tread on the outer periphery of abase tire is known among tire manufacturing apparatuses. On this apparatus, a separately manufactured base tire, which serves as the base of a tire, and an annular tread, which has been cured in advance, are joined together as they are brought closer to each other by a plurality of units holding them separately.

Specifically, such a tire manufacturing apparatus consists of a drum shaft, a rim assembly, a tread expanding means, a tread pressing unit, and a moving mechanism. The drum shaft, extending horizontally from the machine body, rotates as it is driven by a motor. The rim assembly provided on the drum shaft holds a base tire in such a manner as to allow air to be injected into the base tire. The tread expanding means has a plurality of bar members (fingers) for synchronized expansion or contraction, the bar members, which have each a plurality of rollers protruding and disposed in two upper and lower rows, arranged at equal distances on a circumference. And the moving mechanism moves the tread expanding means and the tread holder toward the rim assembly. On this apparatus, an annular tread is first held on the plurality of bar members such that the inner periphery of the annular tread is radially expanded, and a base tire is secured to the rim assembly. Then the tread radially expanded by the tread expanding means is moved to a predetermined position relative to the base tire, and then the tread is brought closer as the bar members come in contact with the outer periphery of the base tire. Finally the tread is held down to the base tire by the tread pressing unit and then the bar members are pulled out, thus accomplishing the integration of a base tire and a tread.

Also, another tire manufacturing apparatus is of such a structure that the bar members are advanced and retracted individually. Since the bar members can be freely advanced or retracted relative to the support member supporting the bar members, pulling the bar members out from between the base tire and the tread will accomplish the integration of a base tire and a tread.

Further, its tread expanding unit is provided with a sensor to control the advance and retraction of the bar members. And when the tread is placed on the bar members, both the edge portions of the tread are detected as they pass along the sensor, and the width center of the tread is calculated therefrom. Then the positions at which the tread is held on the respective bar members are detected. Now the bar members are advanced or retracted individually according to these detections so that the edge of the tread comes in contact with a positioning member provided at a predetermined position on each bar member. Thus the tread is aligned with respect to the tread expanding unit.

However, in the former case, the tread radially expanded by the tread expanding means may not often be mounted on the base tire in a correctly aligned condition. Therefore, there may be cases where the tread is defectively mounted on the base tire with waves in the width direction or in an oblique orientation. Also, in the latter case, the tread may be held aligned on the bar members of the tread expanding unit, but the alignment of the tread is accomplished with the edges of the tread brought into contact with the positioning members. When, for example, the tread is a wing type, that is, when both edges of the tread are molded thin-walled, the thin tread edges tend to get turned up or deformed when they are brought into contact with the positioning members. Thus, when the tread is mounted on the base tire, the turned-up or deformed portions, which remain on the tread on the base tire, may affect the tire performance negatively. Furthermore, in both the former and latter cases, the bar members are pulled out with the tread pressing unit holding down the annular tread to the base tire. This may cause a friction between the annular tread and the bar members and thus lead to a defective mounting of the tread on the base tire with waves in the width direction

PRIOR ART DOCUMENT

Patent Document

Patent Document 1: Japanese Unexamined Patent Application Publication No. 50-158676
Patent Document 2: U.S. Pat. No. 4,036,677
Patent Document 3: U.S. Pat. No. 6,521,071 B2

SUMMARY OF THE INVENTION

Problem to be Solved by the Invention

The present invention has been made to solve the foregoing problems, and an object thereof is to provide a tire manufacturing apparatus capable of precisely mounting an annular tread on a base tire with the width center of the base tire aligned accurately with the width center of the annular tread without causing the tread to wave or the tread edges to turn up or deform.

Means for Solving the Problem

A first aspect of the present invention provides a tire manufacturing apparatus for mounting an annular tread on the outer periphery of a base tire. The apparatus includes a drum to which a base tire is secured, a holding means for holding the annular tread by its inner periphery, and a moving means for having the holding means approach or separate from the drum along the rotation axis of the drum. The holding means is provided with a conveying means to have the annular tread, which is held by the holding means, approach or separate from the base tire. And the conveying means mounts the annular tread on the outer periphery of the base tire by conveying the annular tread in the approaching direction at a conveyance speed which is equal to the travel speed of the holding means in the separating direction. According to this invention, the annular tread can be mounted on the outer periphery of the base tire as the annular tread is conveyed in the approaching direction at a conveyance speed which is equal to the travel speed of the holding means in the separating direction. This allows the mounting of the annular tread on the base tire without causing a friction between the holding means and the annular tread when the annular tread is separated from the holding means. Therefore, defective mounting of the annular tread with waves in the width direction of the base tire can be prevented.

A second aspect of the present invention provides a tire manufacturing apparatus for which the holding means may be a plurality of holding means disposed on a concentric circle with their center being the central axis of the drum and the conveying means may be a conveyor belt set along the extension direction of the holding means. According to this invention, the annular tread is held by the holding means provided with a plurality of conveyor belts. Thus, the annular tread, even when it is thin-walled in the edges, can be moved on the holding means without deformation.

A third aspect of the present invention provides a tire manufacturing apparatus for which the conveyance speed may be set based on the travel speed of the holding means in the separating direction. According to this invention, the conveyance speed at which the annular tread weighing much lighter than the holding means is conveyed is set based on the travel speed of the heavy holding means. This assures more precise mounting of the annular tread on the base tire by making its control easier.

A fourth aspect of the present invention provides a tire manufacturing apparatus which may further include an expanding means for moving the plurality of holding means in the radial direction of the drum. According to this invention, the annular tread can be radially expanded by the plurality of holding means.

A fifth aspect of the present invention provides a tire manufacturing apparatus which may further include a first detecting means for detecting the width center of the base tire and a second detecting means for detecting the width center of the annular tread. According to this invention, a tire can be manufactured with the annular tread mounted on the base tire such that the width center of the base tire is aligned with the width center of the annular tread.

BRIEF DESCRIPTION OF THE DRAWINGS

FIG. 2 is a side view and a plan view of a base tire holding unit in accordance with the present invention.

FIG. 3 is aside view and an elevational view of a tread expanding unit in accordance with the present invention.

FIG. 4 is a side view and a plan view of a holding means in accordance with the present invention.

Hereinafter, the invention will be described based on preferred embodiments which do not intend to limit the scope of the claims of the present invention but exemplify the invention. All of the features and the combinations thereof described in the embodiments are not necessarily essential to the invention, and they include constructions and arrangements to be employed selectively.

BEST MODE FOR CARRYING OUT THE INVENTION

Hereinafter, a description will be given of a tire manufacturing apparatus 1 according to the present invention.

Figure 1:
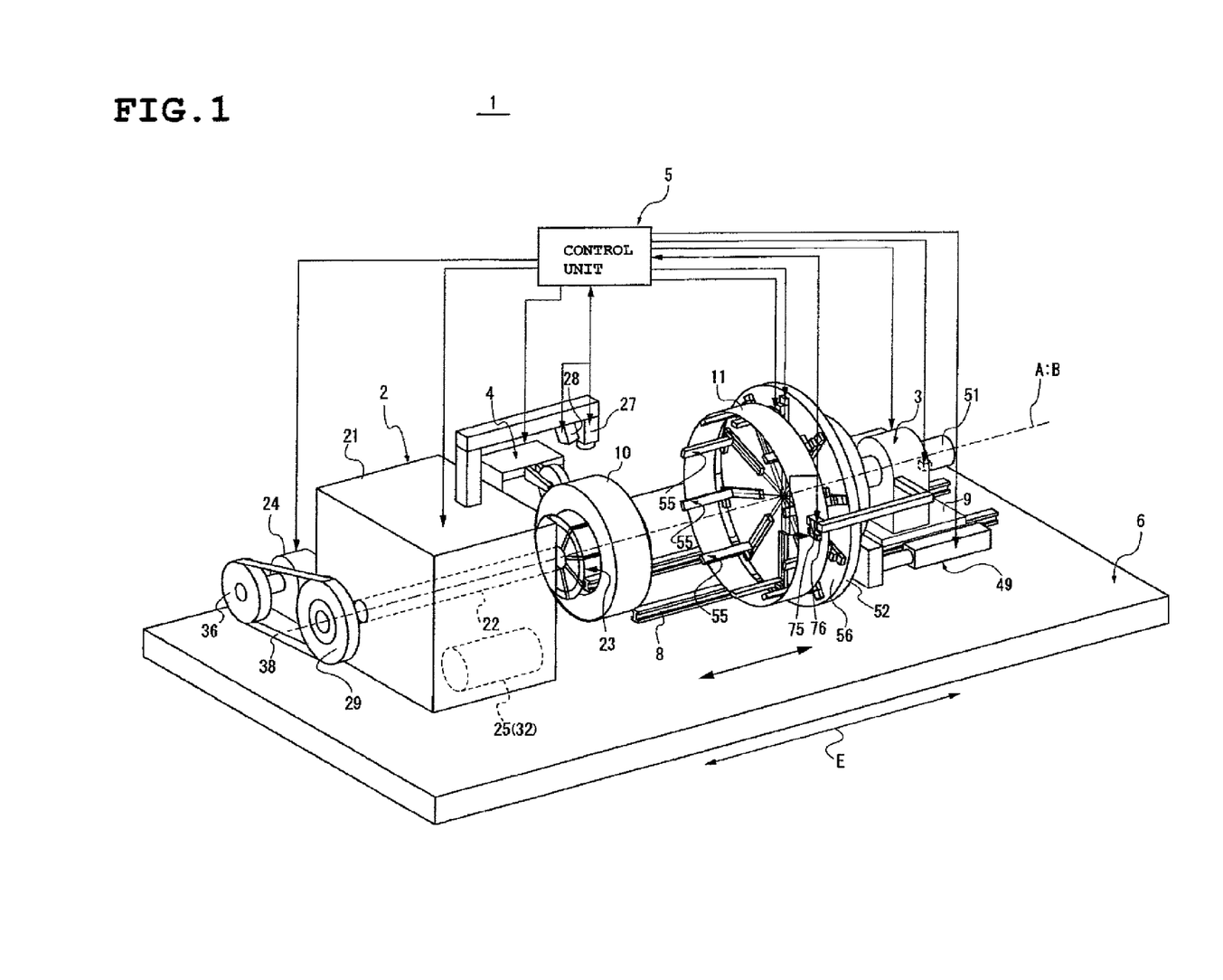
FIG. 1 is an overall schematic illustration of a tire manufacturing apparatus in accordance with the present invention.

FIG. 1 is an overall schematic illustration of the tire manufacturing apparatus 1. As shown, the tire manufacturing apparatus 1 roughly consists of a base tire holding unit 2 for holding a base tire 10, a tread expanding unit 3 for radially expanding an annular tread (hereinafter referred to as "tread") 11 which has been cured and molded in advance with its internal diameter smaller than the external diameter of the base tire 10, a pressing unit 4 for pressing the surface of the tread 11 mounted on the base tire, and a control unit 5 for controlling the mounting of the tread 11 onto the base tire 10. All these units are installed on a base 6 having the installation surface formed horizontally. These units 2 to 5 will be explained one by one below. Note that although the annular tread has been described above as having an inner diameter smaller than the external diameter of the base tire, the annular tread may have an inner diameter equal to or larger than the external diameter of the base tire.

Figure 2A:
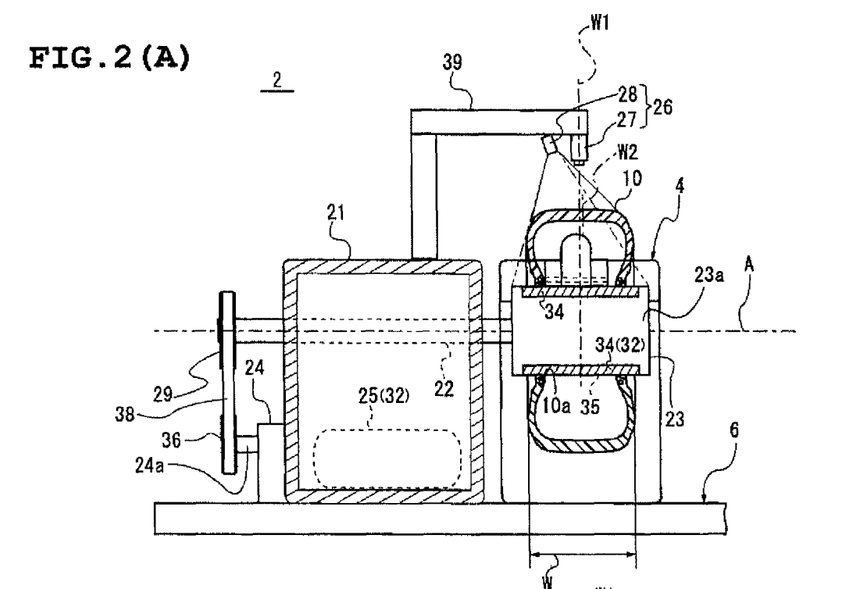
Figure 2B:
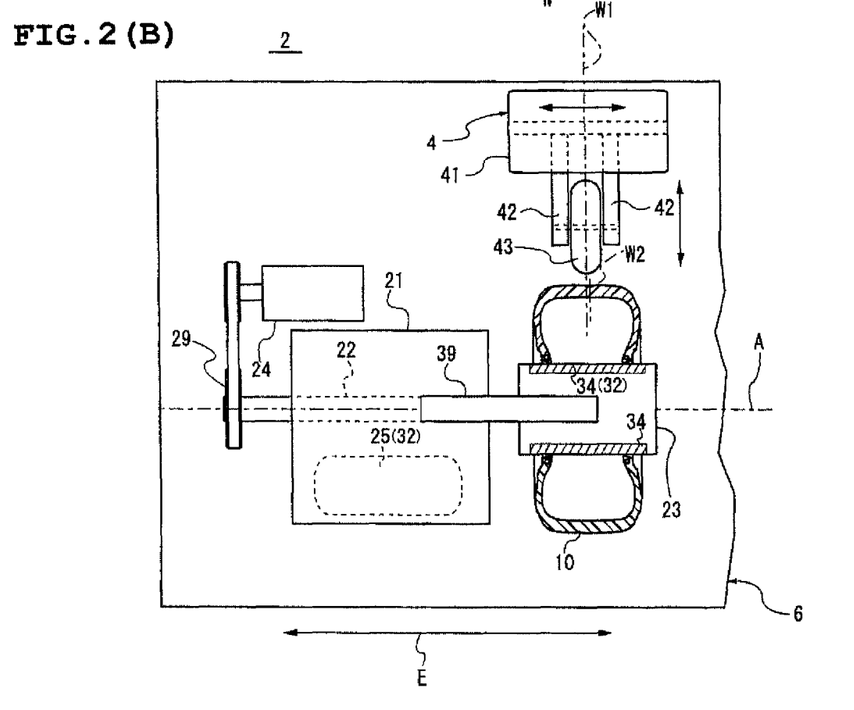

FIG. 2A is a side view of a base tire holding unit 2, and FIG. 2B is a plan view of the base tire holding unit 2.

The base tire holding unit 2 includes a holding unit body 21, a drum shaft 22 extending horizontally from the inside to the outside of the holding unit body 21, a drum motor 24 to cause the rotation of the drum shaft 22, a compressor 25 installed inside the holding unit body 21, a drum 23 fixed to an end of the drum shaft 22, and a base tire center detecting means 26 consisting of a CCD camera 27 and a light casting unit 28. The holding unit body 21, which is mounted on one side in the longitudinal direction E of the base 6, has the drum shaft 22 penetrating it in the longitudinal direction E. The drum shaft 22 is rotatably supported by not-shown bearings which are fixed to the holding unit body 21. The drum 23 is attached to one end of the drum shaft 22, and a pulley 29 to the other end thereof.

The drum 23, which is a cylindrically-formed wheel, is made up of a plurality of drum pieces which are the radially divided pieces of the wheel. It is provided with an expansion mechanism capable of radially expanding or contracting the drum pieces in correspondence to a variety of tire sizes. A preferred expansion mechanism may be such that the drum pieces are moved radially with air supplied into or discharged from not-shown air cylinders attached to the drum pieces. The drum 23, fitted along the inner periphery 10a of the base tire 10, holds the base tire 10 rotatably. Also, mounted on the peripheral surface 23a of the drum 23 is a seal ring 34, which constitutes an internal pressure holding means 32. The seal ring 34, which may be a belt-like rubber or like material formed into a cylinder, is attached firmly to the drum 23, wrapping around the peripheral surface 23a thereof. Further, the seal ring 34 is provided with a valve 35 which penetrates it in the thickness direction. Thus, when the drum 23 is expanded radially, the inner periphery 10a of the base tire 10 remains in close contact with the seal ring 34, with the seal ring 34 stretched in such a manner as to cover the gaps between the drum pieces. This creates a closed space inside the base tire 10 sealed by the seal ring 34, thereby preventing the leaks of air supplied into the base tire 10 through the valve 35.

The drum motor 24 may be a geared motor having a reduction mechanism therewithin, and the rotative force of the motor is outputted in a decelerated state. A pulley 36 is attached to the rotation output shaft 24a of the drum motor 24. A belt 38 is set on the pulley 36 and the pulley 29 fixed to the drum shaft 22, and the rotation of the drum motor 24 is communicated to the drum shaft 22 by way of the belt 38.

The base tire center detecting means 26, which consists of a CCD camera 27 and a light casting unit 28, is secured to an end of a support arm 39 extending from the top surface of the holding unit body 21. The CCD camera 27 is anchored such that the imaging center coincides with the width center W1 of the drum 23, whereas the light casting unit 28 is anchored to the support arm 39 at a predetermined angle so that a slit light cast therefrom extends in a width direction of the drum 23. The width of the slit light cast from the light casting unit 28 is so set as to be wider than the width of the base tire. And the control unit 5 to be discussed later detects the width W of the base tire 10 from the image outputted from the CCD camera 27 and further detects the position of the width center W2 of the base tire 10 based on the width W.

The pressing unit 4, called the stitcher roller, is disposed in a position opposite to the periphery of the base tire 10 mounted on the drum 23. As shown in FIG. 2B, the pressing unit 4 includes a frame 41 installed upright on the base 6, a pair of arms 42, 42 projecting in opposition to the periphery of the base tire 10 from a side of the frame 41, and a roller 43 held rotatably by the arms 42, 42. The arms 42, 42 projecting from the frame 41, facing the periphery of the base tire 10, are moved in the width direction and the radial direction of the base tire 10 by a not-shown drive mechanism. The roller 43, rotatably held by the arms 42, rotates as it comes in contact with the surface of the tread 11 mounted on the base tire 10, and presses the tread 11 against the base tire 10, thereby removing its distortions present when the tread 11 is first applied to the base tire 10.

Figure 3A:
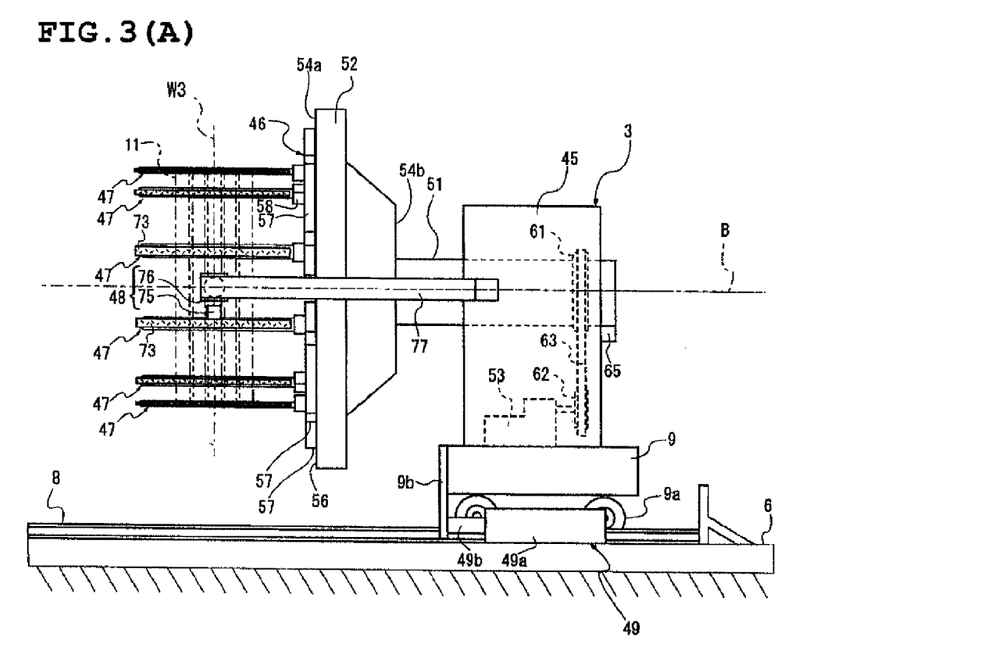
Figure 3B:
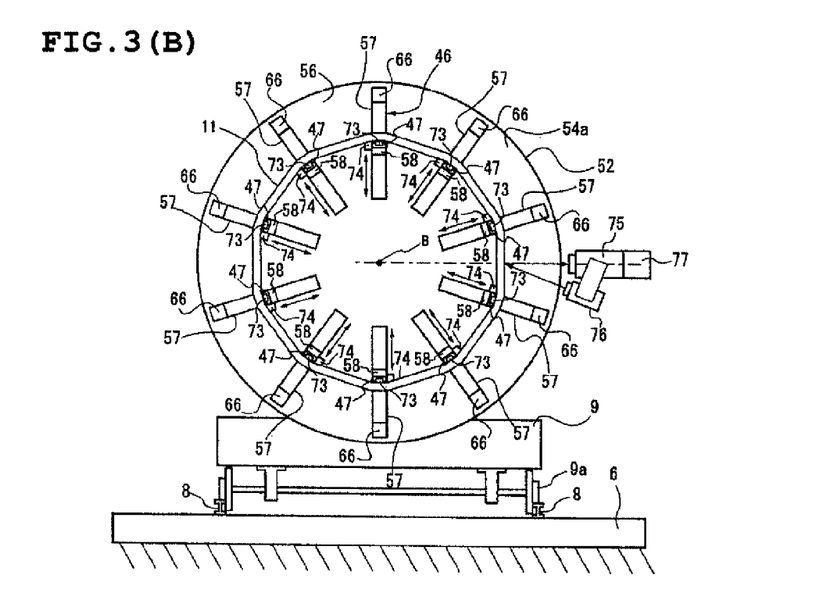

FIG. 3A is a side view of a tread expanding unit 3, and FIG. 3B is an elevational view of the tread expanding unit 3.

Between the drum 23 of the base tire holding unit 2 and the tread expanding unit 3, a pair of rails 8, 8 is laid on the base 6 in parallel with the central axis A of rotation of the drum shaft 22. The tread expanding unit 3 is disposed on a pedestal 9 with wheels 9a which are movable toward or away from the drum 23 on the rails 8, 8. The tread expanding unit 3 includes an expanding unit body 45, expanding means 46, holding means 47, a tread width center detecting means 48, and a moving means 49. The expanding unit body 45 is made up principally of a main spindle 51, a circular plate 52, and a tread rotating motor 53. The main spindle 51, which is a shaft member extending horizontally from the inside to the outside of the expanding unit body 45, is supported by not-shown bearings provided within the expanding unit body 45 such that the central axis B thereof is coaxial with the central axis A of the drum shaft 22. In other words, the central axis B of the tread expanding unit 3 is aligned with the central axis A of the drum shaft 22 of the base tire holding unit 2.

The circular plate 52 is attached to the end of the main spindle 51 extending toward the base tire holding unit 2. The circular plate 52, which is disc-shaped, has a flat mounting surface 54a in opposition to the drum 23 and a flange surface 54b connected to the main spindle 51. The circular plate 52 is so formed that the diameter thereof is larger than that of the tread 11 to be mounted. The mounting surface 54a and the flange surface 54b are formed as planes parallel to each other, and the flange surface 54b is coupled to the main spindle 51 in such a manner that the central axis B of the main spindle 51 is orthogonal thereto. A pulley 61 is attached to the middle part of the main spindle 51 within the expanding unit body 45. The tread rotating motor 53 for rotating the main spindle 51 is installed within the expanding unit body 45 and anchored to the pedestal 9. A pulley 62 is attached to the rotation output shaft of the tread rotating motor 53. A belt 63 is set on the pulley 61 and the pulley 62, and the rotative force of the tread rotating motor 53 is communicated to the main spindle 51 by way of the belt 63. Also, a rotational angle sensor 65 for detecting the rotational angle of the circular plate 52 is attached to the other end of the main spindle 51 and outputs the rotational angle detected to the control unit 5 to be discussed later.

A plurality of expanding means 46 are mounted on the mounting surface 54a of the circular plate 52.

The expanding means 46 are each comprised of a linear rail 57 and a slider 58 which slides on the linear rail 57. The linear rails 57, which are rail members extending radially from the center of the mounting surface 54a, are installed at even intervals circumferentially on the circular plate 52. The linear rail 57 has a rotating bolt extending in its extension direction, and the slider 58 has a nut associated with the rotating bolt. These rotating bolt and nut constitute a bolt and nut mechanism. Thus, rotation of the rotating bolt driven by a servo motor 66, which is mounted on an end of the linear rail 57, can cause the slider 58 to slide along the linear rail 57 in a radial direction of the circular plate 52.

In the present embodiment, there are 10 sets of a linear rail 57 and a slider 58 which constitute the expanding means, but it should be understood by those skilled in the art that the number is not limited to 10 sets and may be 8 set, 12 sets, etc. Also, although the expanding means are constructed of linear rails 57 in this embodiment, they may be constructed of a linkage mechanism or the like. Also, a holding means 47 is attached to each of the sliders 58.

Figure 4:
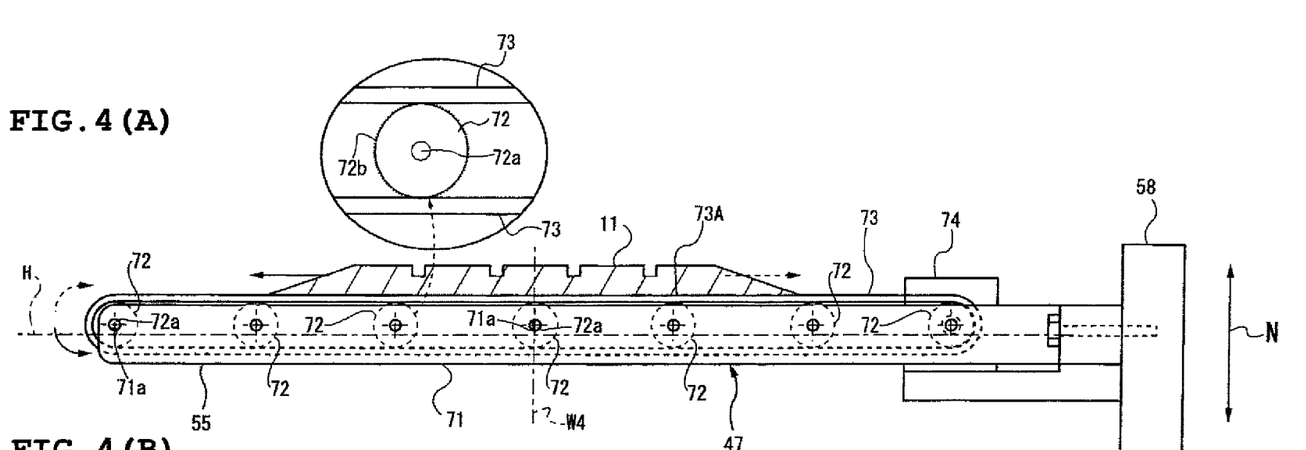

FIG. 4A is a side view of a holding means 47, and FIG. 4B is a plan view of the holding means 47.

As shown in FIGS. 4A and 4B, the holding means 47 includes a finger 55 anchored at one end to the slider 58 and extending toward the drum 23, as if jutting out from the mounting surface 53a of the circular plate 52, and a conveyor belt 73 as a conveying means stretched in the extension direction of the finger 55. The finger 55 consists of a pair of long frame plates 71, 71 extending horizontally from the slider 58 toward the drum 23 and a plurality of timing wheels 72 rotatably supported between the long frame plates 71, 71 at predetermined intervals along the extension direction thereof. The long frame plates 71, 71, which are formed with a length sufficiently longer than the width of the tread 11 to be mounted, have a plurality of bearing holes 71a to support the revolving shafts 72a of the plurality of timing wheels 72. Of the bearing holes 71a, the bearing hole 71a closest to the drum 23 is located such that part of the timing wheel 72 placed there is exposed from the end of the long frame plates 71, 71. Also, the centers of the bearing holes 71a are located offset to one side from the center line H of the width (finger thickness) of the long frame plates 71, 71, such that part of the timing wheels 72 set in place is exposed above the top side of the long frame plates 71, 71.

The timing wheels 72 turn around the revolving shafts 72a supported by the bearing holes 71a. And a servo motor 74 is directly connected to the revolving shaft 72a of the timing wheel 72 located closest to the slider 58. The outer periphery 72b of each timing wheel 72 is indented along the circumference thereof.

A conveyor belt 73 as a conveying means is set on the plurality of timing wheels 72. With the conveyor belt 73 set on the plurality of timing wheels 72, the top surface 73A of the conveyor belt 73 which comes in contact with the inner periphery of the tread 11 is located above the top side of the long frame plates 71, 71 and also exposed on the side closer to the drum 23 from the end of the long frame plates 71, 71. Therefore, as shown in FIG. 1, driven by the normal or reverse rotation of the servo motor 74, the tread 11 set on the plurality of fingers 55 can be moved on the conveyor belt 73 in the direction closer to or further from the drum 23 without touching the long frame plates 71, 71. Also, since the long frame plates 71, 71 of the finger 55 are fixed to the slider 58, the tread 11 set on the plurality of fingers 55 can be expanded or contracted as the plurality of sliders 58 are moved in the normal direction N along the linear rails 57 on the circular face 56 of the circular plate.

The tread width center detecting means 48 consists of a CCD camera 75 and a light casting unit 76, for instance. The CCD camera 75 and the light casting unit 76 are mounted on the end of an arm 77 extending horizontally from the expanding unit body 45. The CCD camera 75 captures an image along the width direction of the tread 11 set on the fingers 55 and outputs the captured image to the control unit 5 to be discussed later. This is for the control unit 5 to detect the surface feature or colored line, e.g., a white line, present at the width center W4 of the tread 11 and continuing circumferentially around the tread 11.

The moving means 49 consists of an actuator which has a servo motor therewithin. With the rotation of the servo motor, a piston 49b advances from or retracts back to a cylinder 49a. The moving means 49 is constructed such that the cylinder 49a is anchored to the base 6 and the piston 49b is attached to a pushing plate 9b which is secured to the front end of the pedestal 9. The piston 49b is advanced or retracted according to the advance or retract signal from the control unit 5 to be discussed later, thereby getting the tread expanding unit 3 to approach or separate from the drum 23 of the base tire holding unit 2.

Figure 5:
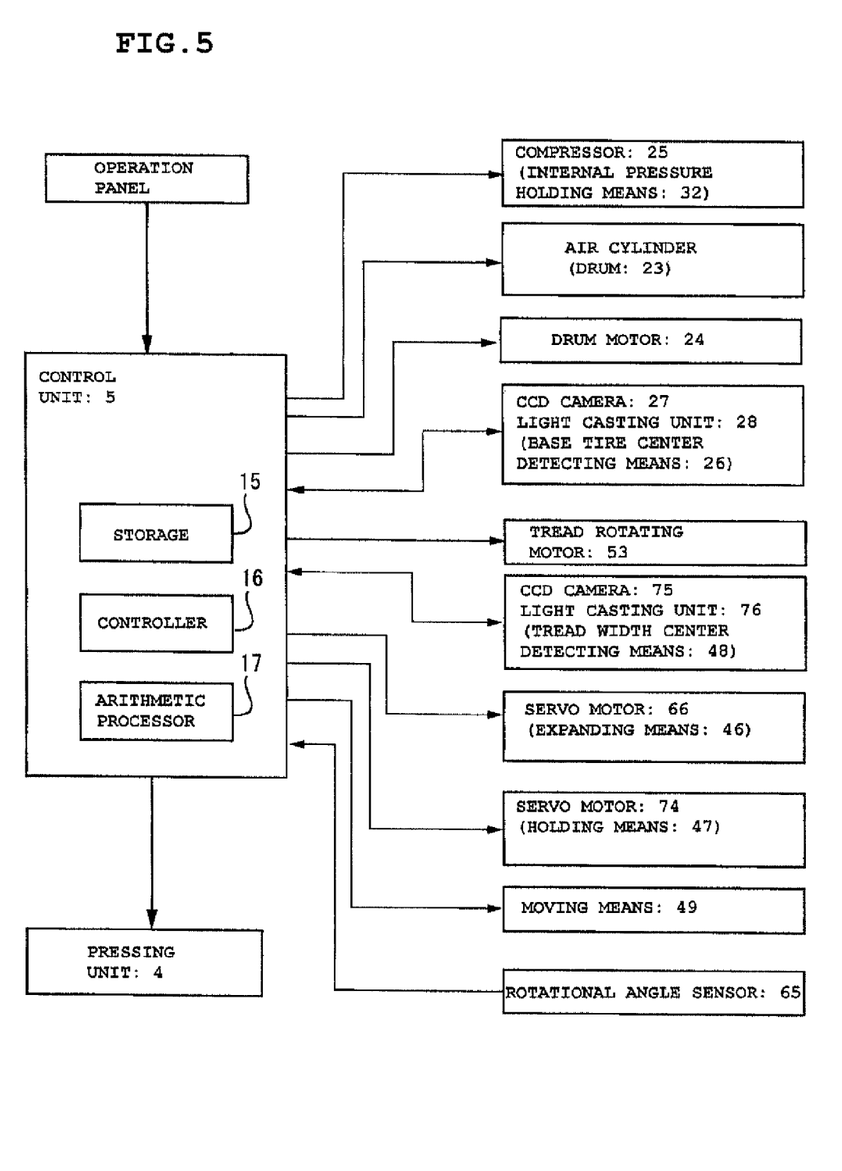
FIG. 5 is a block diagram of a control unit in accordance with the present invention.

FIG. 5 shows a block diagram and electrical connection of a control unit 5.

The control unit 5, which includes a storage 15, a controller 16, and an arithmetic processor 17, controls the mounting of the tread 11 to the base tire 10. Coupled to the control unit 5 are an operation panel, an air cylinder as the expanding mechanism for the drum 23, a compressor 25 as the internal pressure holding means 32, a drum motor 24, a tread rotating motor 53 of the tread expanding unit 3, servo motors 66 of the expanding means 46, servo motors 74 of the holding means 47, a rotational angle sensor 65, a CCD camera 27 and a light casting unit 28 of the base tire center detecting means 26, a CCD camera 75 and a light casting unit 76 of the tread width center detecting means 48, a moving means 49 for moving the tread expanding unit 3 toward or away from the base tire holding unit 2, and a pressing unit 4 for evenly press the tread 11 mounted on the base tire 10.

The storage 15 stores information on the type and size of the tread 11, the structure and size of the base tire, and the pattern of combination of tread 11 and base tire 10 in advance. The controller 16 controls the overall aspects of mounting the tread 11 on the base tire 10.

The arithmetic processor 17 determines the amount of displacement of the width center W4 of the tread 11 from the width center W2 of the base tire 10 as detected by the base tire center detecting means 26 and calculates the amount of shift to be made by the moving means 49 to have the width center W2 of the base tire 10 aligned with the width center W4 of the tread 11. Also, the arithmetic processor 17 calculates the rotating speed of the conveyor belts 73 when the tread 11 is mounted onto the base tire 10 according to the speed at which the tread expanding unit 3 is moved away from the base tire holding unit 2.

The operation panel to be coupled to the controller 16 is a touch panel type or the like capable of selectively inputting information on the tread 11 to be mounted and the base tire 10. The information on the tread 11 and the base tire 10 is to be inputted by an operator.

Based on the information on the base tire 10 inputted from the operation panel, the controller 16 outputs a holding signal to the air cylinder, which is the expansion and contraction mechanism for the drum 23, in response to the size of the base tire 10, thereby causing the expansion or contraction of the drum 23 to fit the inner diameter of the base tire 10.

Also, the controller 16 outputs an internal pressure supply signal to the internal pressure holding means 32 to supply air from the compressor 25 so as to keep a predetermined internal pressure inside the base tire 10 that is secured to the drum 23.

Also, the controller 16 outputs to the CCD camera 27 of the base tire center detecting means 26 a zero point detection signal to detect the width center W1 of the drum 23 before the base tire 10 is set on the drum 23 and a base tire width center detection signal to start an image pickup to detect the width center W2 of the base tire 10 held on the drum 23. And as the drum 23 starts rotating at a rotation start signal from the controller 16 to the drum motor 24, the captured images start being outputted from the CCD camera 27 to the control unit 5.

Also, the controller 16 outputs a tread rotation signal to the tread rotating motor 53. As the tread rotating motor 53 rotates in response to the tread rotation signal, the tread 11 set on the plurality of fingers 55 rotates circumferentially, and the amount of displacement between the extension direction center W3 of the fingers 55 and the width center W4 of the tread 11 is detected by the tread width center detecting means 48.

Also, the controller 16 outputs a tread width center detection signal to the CCD camera 75 of the tread width center detecting means 48 to start an image pickup simultaneously with its outputting a tread rotation signal to the tread rotating motor 53. And the CCD camera starts capturing images in response to the signal and outputs captured images to the control unit 5.

Also, the controller 16 outputs an expansion signal or a contraction signal to the servo motors 66 for the plurality of sliders 58. With an expansion signal outputted to the servo motors 66, the fingers 55 move gradually outward in the radial direction of the circular face 56 until the diameter of the tread 11 set on the plurality of fingers 55 becomes larger than the diameter of the base tire 10. On the other hand, with a contraction signal outputted to the servomotors 66, the fingers 55 move gradually inward in the radial direction of the circular face 56 until the diameter of the tread 11 set on the plurality of fingers 55 shrinks from the expanded diameter to the diameter close to that of the drum 23.

It is to be noted that the contraction signal is one to be outputted when the width center W2 of the base tire 10 reaches an alignment with the width center W4 of the tread 11.

Also, the controller 16 outputs a centering signal and a mounting signal to the servo motors 74 to drive the conveyor belts 73 of the fingers 55 of the tread expanding unit 3.

The centering signal, which is a signal outputted individually to the plurality of servo motors 74, is given to adjust the width center W4 of the tread 11 set on the fingers 55 to the extension direction center W3 of the finger 55. That is, with a centering signal outputted, the inner periphery of the tread 11 in contact with the top surface 73A of the conveyor belt 73 is adjusted in the drive direction (closer to or further from the drum 23) of the conveyor belt 73. And when the adjustment operations with all the servo motors 74 are completed, the tread 11 is set in an identical position on all the fingers 55.

The mounting signal, which is a signal outputted collectively to the plurality of servo motors 74, is given to convey, or transfer, the tread 11 in the same attitude, or position, as it is set on the fingers 55 after the adjustment operations. The mounting signal is outputted when the tread 11 is placed in such a position that the width center W2 of the base tire 10 is aligned with the width center W4 of the tread 11. And based on this signal, the tread 11 is conveyed out of the conveyor belts 73 of the fingers 55 to be placed on the outer periphery of the base tire 10.

Also, the controller 16 outputs a positioning signal, a separation signal, and a standby signal to the moving means 49. The positioning signal is a signal to bring the tread expanding unit 3, that is, the tread 11, closer to the drum 23 of the base tire holding unit 2. With this signal outputted, the tread expanding unit 3 is moved closer to the drum 23 on the rails 8. The separation signal is a signal outputted when the tread 11 is to be placed on the outer periphery of the drum 23 after the tread expanding unit 3 is moved to a predetermined position (placement position). With this signal outputted, the tread expanding unit 3 is moved in a separating direction from the drum 23 on the rails 8.

Also, the controller 16 outputs a conditioning signal to the pressing unit 4. The conditioning signal is a signal to move the roller 43 of the pressing unit 4 to the tread 11 mounted on the base tire 10 and press the tread 11 with the roller 43 in such a manner as to fix it to the base tire 10.

Also, inputted to the controller 5 are images captured by the base tire center detecting means 26 and images captured by the tread width center detecting means 48. Further, inputted thereto are the angles of the fingers captured by the tread width center detecting means 48 from the rotational angle sensor 65.

Figure 6:
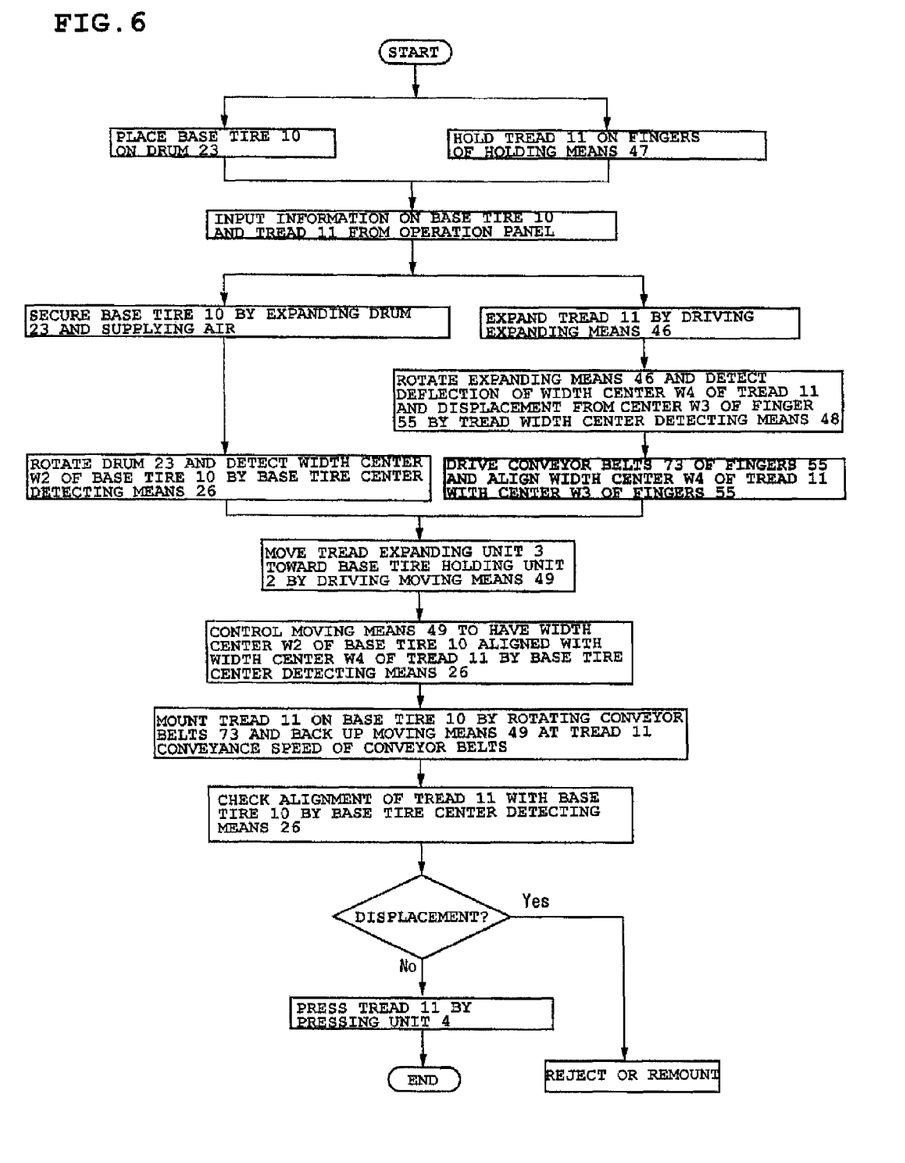
FIG. 6 is a flowchart showing a procedure for mounting an annular tread on a base tire in accordance with the present invention.

FIG. 6 is a flowchart showing a procedure for mounting a tread 11 on a base tire 10 using a tire manufacturing apparatus 1 of the present invention.

As shown in FIG. 6, in the mounting of a tread 11 on a base tire 10, the base tire 10 is first placed on the periphery of a drum 23, and the tread 11 is set on a plurality of fingers 55.

Next, information on the tire size of the base tire 10 and the type of the tread 11 is inputted from an operation panel. A control unit 5 outputs to the drum 23 an internal pressure supply signal to supply air collected in a compressor 25 to the base tire 10 by expanding the drum 23, thereby securing the base tire 10 to the drum 23.

Next, the drum 23 is rotated, and the images of the surface of the base tire 10 are captured continuously by a CCD camera 27 to make certain that the base tire 10 is so set that the width center W2 thereof is orthogonal to the central axis A of the drum 23 throughout the circumference of the base tire 10. If the base tire 10 is not set with the width center W2 thereof orthogonal to the central axis A of the drum 23 throughout the circumference thereof, then the base tire 10 must be reset on the drum 23.

When the base tire 10 is so set that the width center W2 thereof is orthogonal to the central axis A of the drum 23 throughout the circumference of the base tire 10, the data on the width center W2 of the base tire 10 is stored.

On the other hand, the tread 11 set on the fingers 55 of the tread expanding unit 3 is expanded, with all the sliders 58 simultaneously moving radially outward, until the diameter of the tread 11 becomes larger than the outside diameter of the base tire 10, in response to an expansion signal from the control unit 5.

Next, the control unit 5 outputs a tread rotation signal to a tread rotating motor 53 to rotate a circular plate 52 and further outputs a tread width center detection signal to a CCD camera 75 to capture the images of the surface of the rotating tread 11. Based on the images captured and outputted by the CCD camera 75, the control unit 5 detects a position on the tread 11 serving as a marker, that is, the width center W4 of the tread 11 and calculates the amount of displacement between the width center W4 and the extension direction center W3 of each finger 55. Further, the control unit 5 stores the amount of displacement by associating it with the angle of the drum 23 detected by a rotational angle sensor 65 when the amount of displacement is detected. And the control unit 5 causes the servo motor 74 of the finger 55 located at the angle associated with the amount of displacement to run and rotate the conveyor belt 73. In this manner, the control unit 5 controls the conveyor belts 73 of all the fingers 55 so that the width center W4 of the tread 11 is located at the extension direction center W3 of the finger 55. As a result, the tread 11 is held in alignment with the extension direction center W3 of the fingers 55.

Through the above-described process, the setting of the base tire 10 on the drum 23 and the holding of the tread 11 on the fingers 55 are completed. Then the mounting of the tread 11 on the base tire 10 is performed through the following process.

With the conveyor belts 73 held in alignment with the fingers 55, the control unit 5 outputs a positioning signal to a moving means 49, thereby moving the tread expanding unit 3 closer to the drum 23 of the base tire holding unit 2 and stopping it at a position where the tread 11 surrounds the periphery of the base tire set on the drum 23.

Next, the CCD camera 27 begins shooting the images to detect the amount of displacement between the width center W4 of the tread 11 and the width center W2 of the base tire 10 and outputs the captured images. It is to be noted that, in actuality, the width center W4 of the tread 11 only is detected since the width center W2 of the base tire 10 is already stored as the position detected when the base tire 10 is initially secured. From the images of the surface of the tread 11 captured by the CCD camera 27, the control unit 5 detects the surface feature representing the width center W4 of the tread 11 and also detects the amount of its displacement from the already stored position of the width center W2 of the base tire 10. Then the control unit 5 adjusts the position of the tread 11 relative to the base tire 10 by driving the moving means 49 based on the detected amount of displacement, so that the width center W4 of the tread 11 is aligned with the width center W2 of the base tire 10.

Next, as the width center W4 of the tread 11 is aligned with the width center W2 of the base tire 10, the control unit 5 outputs a contraction signal to the servo motors 66, thereby causing the sliders 58 to move toward the center until the bottoms of the fingers 55 come in contact with the periphery of the base tire 10.

Next, the control unit 5 outputs a separation signal to the moving means 5 to have the tread expanding unit 3 back away and at the same time outputs a mounting signal to the servo motors 74 of the fingers 55 to rotate the conveyor belts 73 at such a speed as to place the tread 11 onto the periphery of the base tire 11 in correspondence to the backing speed of the tread expanding unit 3. That is, the control unit 5 outputs a mounting signal to the servo motors 74 of the fingers 55 such that the speed at which the tread expanding unit 3 separates itself from the drum 23 is the same as the speed at which the tread 11 is conveyed by the conveyor belt 73. As a result, the tread 11 is mounted onto the base tire 10 in a relatively stationary manner.

Next, when the tread 11 is placed completely over the periphery of the base tire 10 separate from the fingers 55, the control unit 5 outputs a standby signal to the moving means 49 to move the tread expanding unit 3 to a predetermined standby position.

Then the control unit 5 outputs a rotation start signal to the drum motor 24 to check for any abnormality of the base tire 10 with the tread 11 mounted thereon, and further the images of the surface of the mounted tread 11 are captured circumferentially by the CCD camera 27. Using the images captured by the CCD camera 27, the control unit 5 detects the right and left amounts of deflection of the width center W4 of the tread 11 and the amount of displacement of the width center W4 of the tread 11 from the width center W2 of the base tire 10 stored in advance in the control unit 5. Thus, normalcy is determined if the amount of deflection and the amount of displacement are within their predetermined limits. And when an abnormality is determined, an error message is outputted to the operation panel, and the base tire 10 with the tread 11 on should be removed from the drum 23 and disposed of by the operator, for instance.

Next, when the mounting is determined normal, the control unit 5 outputs a conditioning signal to the pressing unit 4 to operate the roller 43 in contact with the surface of the tread. In this operation, the roller 43 is traversed in the tire width direction while the tire with the tread on rotates a predetermined number of turns in order to condition the tread 11 to the base tire 10.

Through the above-described process, the mounting of the tread 11 on the base tire 10 is completed.

As described hereinabove, according to a tire manufacturing apparatus 1 of the present invention, a base tire holding unit 2 for securing a base tire 10 and a tread expanding unit 3 in a position opposite to the base tire holding unit 2 are mounted on a base 6. The tread expanding unit 3 approaches the base tire holding unit 2 along the rails 8, 8 laid on the base 6 to mount an expanded tread 11 on a base tire 10 secured to the base tire holding unit 2, thereby accomplishing an integration of the base tire 10 and the tread 11.

In particular, it is possible to align the tread 11, which is placed on the tread expanding unit 3, in parallel with the circular face 56 of the circular plate 52 by individually controlling the conveyor belts 73, which are the conveying means provided on the fingers 55. Therefore, it is only necessary to move the tread expanding unit 3 such that the width center W2 of the base tire is aligned with the width center W4 of the tread 11.

Also, the servo motors 74 are respectively controlled to drive the conveyor belts 73 on all the fingers 55 in synchronism with each other. This will ensure the positioning of the width center W2 of the base tire 10 aligned with the width center W4 of the tread 11. And the movement of the tread expanding unit 3 is controlled in correspondence to the rotation of the conveyor belts 73. Thus the synchronism of the retraction speed of the piston 49b with the rotating speed of the conveyor belts 73 keeps the tread 11 stationary in place and makes it possible to place the tread 11 from one edge to the other on the periphery of the base tire 10.

In the embodiment described above, the tread 11 is mounted onto the base tire 10 while it is kept in a relatively stationary state. And this is accomplished by a mounting signal outputted to the servomotors 74 of the fingers 55 to equalize the separation speed of the tread expanding unit 3 from the drum 23 and the tread 11 conveyance speed of the conveyor belts 73. However, the arrangement maybe such that the tread expanding unit 3 is backed up with its separation speed from the base tire holding unit 2 calculated by the control unit 5 according to the rotating speed of the conveyor belts when the tread 11 is to be mounted on the base tire 10. In this manner, too, the tread 11 can be mounted on the base tire 10 while it is kept in a relatively stationary state.

The arrangement may also be such that the tire manufacturing apparatus 1 as described above is further provided with an inter-unit distance sensor for detecting the distance between the base tire holding unit 2 and the tread expanding unit 3. In this case, the arithmetic processor 17 of the control unit 5 calculates the amount of displacement between the width center W2 of the base tire and the width center W1 of the drum 23 as detected by the base tire center detecting means 26. Then, using the width center W1 of the drum 23 as the mounting origin, the arithmetic processor 17 calculates the travel distance of the tread expanding unit 3 by adding the amount of displacement as the correction value to the distance between the base tire holding unit 2 and the tread expanding unit 3 as measured by the inter-unit distance sensor. Then the control unit 5 outputs a positioning signal to the moving means 49 to align the width center W2 of the base tire 10 with the width center W4 of the tread 11. When the width center W2 of the base tire 10 is aligned with the width center W4 of the tread 11, a separation signal maybe outputted so that the conveyor belts 73 are driven and the moving means 49 is moved away from the base tire 10 at a speed corresponding to the travel speed of the conveyor belts 73.

In the foregoing specification, the invention has been described with reference to specific embodiments thereof. However, the technical scope of the invention is not limited to the described scope of the embodiments. And it should be evident to those skilled in the art that various modifications and changes may be made thereto without departing from the spirit and scope of the invention.

DESCRIPTION OF REFERENCE NUMERALS 1 tire manufacturing apparatus
2 base tire holding unit
3 tread expanding unit
4 pressing unit
5 control unit
6 base
7 rail
8 pedestal
9a wheel
9b pushing plate
10 base tire
10a inner periphery
11 annular tread
15 storage
16 controller
17 arithmetic processor
21 holding unit body
22 drum shaft
23 drum
23a peripheral surface
24 drum motor
24a rotation output shaft
25 compressor
26 base tire center detecting means
27 CCD camera
28 light casting unit
29 pulley
32 internal pressure holding means
34 seal ring
35 valve
36 pulley
38 belt
39 support arm
41 frame
42 arm
43 roller
45 expanding unit body
46 expanding means
47 holding means
48 tread width center detecting means 49 moving means
49a cylinder
49b piston
51 main spindle
52 circular plate
53 tread rotating motor
54a mounting surface
54b flange surface
55 finger
57 linear rail
58 slider
61 pulley
62 pulley
63 belt
65 rotational angle sensor
66 servo motor
71 long frame plate
71a bearing hole
72 timing wheel
72a revolving shaft
72b outer periphery
73 conveyor belt
74 servo motor
75 CCD camera
76 light casting unit
A, B central axis
W1, W2, W4 width center
W3 center
H center line

The invention claimed is:

1. A tire manufacturing apparatus for mounting an annular tread on a base tire, the apparatus comprising:
 a drum to which the base tire is securable, the base tire being held by the drum;
 a plurality of conveyors, for holding respective positions on an inner periphery of the annular tread, disposed on a concentric circle with the center thereof being the central axis of the drum and configured to convey the annular tread independently in a direction parallel to the central axis of the drum;
 a plurality of holders extending along with an extending direction of the conveyors for holding each conveyor separately;
 a plurality of motors, each motor driving a respective one of the plurality of conveyors;
 a mover capable of having the plurality of holders approach or separate from the drum along the central axis of the drum,
 a controller capable of controlling the plurality of motors and the mover;
 a first detector facing the drum, the controller programmed to calculate the difference in location between a widthwise center of the drum before securing the tire, as determined with the first detector, and a widthwise center of the tire held by the drum after securing the tire to the drum, as determined with the first detector;
 a second detector which the controller is programmed to use to detect a central position in a width direction of the annular tread while the annular tread is held by the plurality of conveyors and rotated around the center of the concentric circle; and
 an inter-unit distance sensor for detecting a distance between the drum and the plurality of holders,
 wherein
 the controller is programmed to control the motors individually such that the central position in the width direction of the annular tread held by the plurality of conveyors is located at a center of each of the holders with respect to an extending direction of each of the holders, based on the detection made by the second detector of the central position in the width direction of the annular tread, and
 the controller is programmed to correct a position of the annular tread held by the plurality of holders to a mounting position of the base tire by driving the mover such that the center in the width direction of the annular tread corresponds with the center in the width direction of the base tire detected by the first detector and the annular tread is mounted on an outer periphery of the base tire based on the distance detected by the inter-unit distance sensor in combination with the difference in location between the widthwise center of the drum and widthwise center of the tire held by the drum determined by the controller with the first detector, and
 the controller is programmed to control the conveying speed of each conveyor so as to be matched with a moving speed of the mover as it is separated from the drum by synchronizing each motor of the plurality of conveyors while the plurality of conveyors are motorized to deposit the annular tread onto the periphery of the base tire.

2. The tire manufacturing apparatus as recited in claim 1, wherein each conveyor is a conveyor belt which is longitudinally aligned with the extending direction of the holders.

3. The tire manufacturing apparatus as recited in claim 1, further comprising an expander for moving the plurality of holders apart from one another in a respective radial direction of the drum.

4. The tire manufacturing apparatus as recited in claim 2, further comprising an expander for moving each of the holders in a respective radial direction of the drum.

* * * * *